US012809124B2

(12) United States Patent
Lim et al.

(10) Patent No.: US 12,809,124 B2
(45) Date of Patent: Nov. 24, 2026

(54) OPTICAL IMAGING SYSTEM

(71) Applicants: Samsung Electro-Mechanics Co., Ltd., Suwon-si (KR); Kumoh National Institute of Technology Industry-Academic Cooperation Foundation, Gumi-si (KR)

(72) Inventors: Tae Yeon Lim, Suwon-si (KR); Yong Joo Jo, Suwon-si (KR); Phil Ho Jung, Suwon-si (KR); Jae Myung Ryu, Gumi-si (KR)

(73) Assignees: Samsung Electro-Mechanics Co., Ltd., Suwon-si (KR); Kumoh National Institute of Technology Industry-Academic Cooperation Foundation, Gumi-si (KR)

( * ) Notice: Subject to any disclaimer, the term of this patent is extended or adjusted under 35 U.S.C. 154(b) by 1075 days.

(21) Appl. No.: 17/870,450

(22) Filed: Jul. 21, 2022

(65) Prior Publication Data

US 2023/0204906 A1 Jun. 29, 2023

(30) Foreign Application Priority Data

Dec. 28, 2021 (KR) ........................ 10-2021-0190122

(51) Int. Cl.
*G02B 9/34* (2006.01)

(52) U.S. Cl.
CPC ...................................... *G02B 9/34* (2013.01)

(58) Field of Classification Search
CPC ................. G02G 9/34; G02G 13/0045; G02G 15/144113
See application file for complete search history.

(56) References Cited

U.S. PATENT DOCUMENTS 7,636,201 B2 12/2009 Sudoh et al.
2003/0161620 A1 8/2003 Hagimori et al.
(Continued)

FOREIGN PATENT DOCUMENTS

CN 111929848 A 11/2020
EP 1 494 054 A1 1/2005
(Continued)

OTHER PUBLICATIONS

Taiwanese Office Action Issued on Jan. 31, 2023, in counterpart Taiwanese Patent Application No. 111128329 (7 Pages in English, 8 Pages in Chinese).

(Continued)

*Primary Examiner* — Jack Dinh
(74) *Attorney, Agent, or Firm* — NSIP Law

(57) ABSTRACT

An optical imaging system includes a first lens group, a second lens group, a third lens group, and a fourth lens group sequentially disposed in ascending numerical order along an optical axis of the optical imaging system from an object side of the optical imaging system toward an imaging plane of the optical imaging system, wherein at least one lens group among the first lens group to the fourth lens group is configured to be movable along the optical axis, the first lens group has a positive refractive power and comprises a reflective member and at least one lens disposed between the object side of the optical imaging system and the reflective member, and the at least one lens is configured to refract light passing through the at least one lens to converge the light to be incident on the reflective member.

20 Claims, 6 Drawing Sheets

(56) References Cited

U.S. PATENT DOCUMENTS

| | | | |
|---|---|---|---|
| 2004/0257644 | A1 | 12/2004 | Nishida |
| 2006/0262420 | A1 | 11/2006 | Matsumoto et al. |
| 2007/0115560 | A1 | 5/2007 | Kushida et al. |
| 2012/0268833 | A1 | 10/2012 | Chou |
| 2015/0109485 | A1 | 4/2015 | Ozaki et al. |
| 2015/0237266 | A1 | 8/2015 | Ichikawa et al. |

FOREIGN PATENT DOCUMENTS

| | | | |
|---|---|---|---|
| JP | 2004-4533 | A | 1/2004 |
| JP | 2007-140158 | A | 6/2007 |
| JP | 2007-298831 | A | 11/2007 |
| JP | 6237106 | B2 | 11/2017 |
| KR | 10-1564413 | B1 | 10/2015 |
| TW | M398129 | U1 | 2/2011 |
| TW | 201243422 | A1 | 11/2012 |
| WO | WO 03/085439 | A1 | 10/2003 |
| WO | WO 2014/087855 | A1 | 6/2014 |

OTHER PUBLICATIONS

Chinese Office Action issued on Mar. 31, 2025, in counterpart Chinese Patent Application No. 202211238020.3 (5 pages in English, 11 pages in Chinese).

Chinese Office Action issued on Aug. 29, 2025, in counterpart Chinese Patent Application No. 202211238020.3 (4 pages in English, 11 pages in Chinese).

Korean Office Action issued on Jun. 4, 2026, in counterpart Korean Patent Application No. 10-2021-0190122 (7 pages in English, 6 pages in Korean).

Indian Office Action issued on Aug. 18, 2026, in counterpart Indian Patent Application No. 202214043504 (6 pages dual text Hindi and English).

OPTICAL IMAGING SYSTEM

CROSS-REFERENCE TO RELATED APPLICATIONS

This application claims the benefit under 35 USC 119(a) of Korean Patent Application No. 10-2021-0190122 filed on Dec. 28, 2021, in the Korean Intellectual Property Office, the entire disclosure of which is incorporated herein by reference for all purposes.

BACKGROUND

1. Field

This application relates to an optical imaging system.

2. Description of Related Art

Recently, camera modules have been a basic feature in mobile electronic devices including smartphones.

In addition, recently a method of mounting a plurality of camera modules having different focal lengths in the mobile electronic devices in order to indirectly implement an optical zoom effect has been proposed.

However, such a method not only requires the plurality of camera modules for the optical zoom effect, but also requires imaging processing through software rather than optical zoom at the time of capturing an image at an intermediate magnification due to a difference in a field of view between the plurality of camera modules, and thus, an image quality is deteriorated.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens group, a second lens group, a third lens group, and a fourth lens group sequentially disposed in ascending numerical order along an optical axis of the optical imaging system from an object side of the optical imaging system toward an imaging plane of the optical imaging system, wherein at least one lens group among the first lens group to the fourth lens group is configured to be movable along the optical axis, the first lens group has a positive refractive power and includes a reflective member and at least one lens disposed between the object side of the optical imaging system and the reflective member, and the at least one lens is configured to refract light passing through the at least one lens to converge the light to be incident on the reflective member.

The at least one lens of the first lens group may include a first lens and a second lens sequentially disposed in ascending numerical order along the optical axis from the object side of the optical imaging system toward the imaging plane of the optical imaging system, the first lens may be disposed between the object side of the optical imaging system and the reflective member, and the second lens may be disposed either between the object side of the optical imaging system and the reflective member, or between the reflective member and the second lens group.

An Abbe number of one of the first lens and the second lens may be 50 or more, and an Abbe number of another one of the first lens and the second lens may be 40 or less.

One of the first lens and the second lens may have a positive refractive power, and another one of the first lens and the second lens may have a negative refractive power, and an Abbe number of a lens having the positive refractive power among the first lens and the second lens may be 50 or more, and an Abbe number of a lens having the negative refractive power among the first lens and the second lens may be 40 or less.

The second lens group may have a negative refractive power, and may be configured to be movable away from the object side of the optical imaging system toward the imaging plane of the optical imaging system to narrow a field of view of the optical imaging system, and to be movable away from the imaging plane of the optical imaging system toward the object side of the optical imaging system to widen the field of view of the optical imaging system.

The second lens group may include a plurality of lenses having a negative composite refractive power, and any one lens among the plurality of lenses of the second lens group may have a concave object-side surface and a concave image-side surface.

In the optical imaging system, $0.6 \leq fGc/fG2 \leq 0.9$ may be satisfied, where fGc is a focal length of the lens having the concave object-side surface and the concave image-side surface, and fG2 is a focal length of the second lens group.

The first lens group and the third lens group may be disposed at fixed positions on the optical axis, and the fourth lens group may be configured to be movable away from the imaging plane of the optical imaging system toward the object side of the optical imaging system to correct a focal position of the optical imaging system as the second lens group is moved away from the object side of the optical imaging system toward the imaging plane of the optical imaging system to narrow the field of view of the optical imaging system, and to be movable away from the object side of the optical imaging system toward the imaging plane of the optical imaging system to correct the focal point of the optical imaging system as the second lens group is moved away from the imaging plane of the optical imaging system toward the object side of the optical imaging system to widen the field of view of the optical imaging system.

In the optical imaging system, $-1.8 \leq kf/kr \leq -1.2$ may be satisfied, where kf is a refractive power of a first surface of the fourth lens group closest to the object side of the optical imaging system, and kr is a refractive power of a last surface of the fourth lens group closest to the imaging plane of the optical imaging system.

The fourth lens group may be further configured to be movable away from the imaging plane of the optical imaging system toward the object side of the optical imaging system as an object distance changes from infinity to a near distance, and $0 \leq |Laf/fG4| \leq 0.1$ may be satisfied, where Laf is a movement amount of the fourth lens group when the object distance changes from infinity to the near distance at a telephoto end of the optical imaging system at which the field of view of the optical imaging system is narrowest, and fG4 is a focal length of the fourth lens group.

The third lens group and the fourth lens group may each have a positive refractive power.

The third lens group may include a stop and a plurality of lenses sequentially disposed along the optical axis away from the object side of the optical imaging system toward the imaging plane of the optical imaging system, and a lens disposed closest to the stop among the plurality of lenses of the third lens group may have a positive refractive power.

An object-side surface or an image-side surface of the lens disposed closest to the stop may be aspherical.

A first surface of the first lens group is a surface of the first lens group disposed at the object side of the optical imaging system, and $0.4 \leq D13/TTL \leq 0.6$ may be satisfied, where D13 is an optical axis distance from the first surface of the first lens group to the stop, and TTL is an optical axis distance from the first surface of the first lens group to the imaging plane.

A first surface of the first lens group is a surface of the first lens group disposed at the object side of the optical imaging system, and $0.4 \leq D13/fG1 \leq 0.8$ may be satisfied, where D13 is an optical axis distance from the first surface of the first lens group to the stop, and fG1 is a focal length of the first lens group.

In the optical imaging system, $0.4 \leq fG12w/fG12t \leq 0.7$ may be satisfied, where fG12w is a composite focal length of the first lens group and the second lens group at a wide-angle end of the optical imaging system at which the field of view of the optical imaging system is widest, and fG12t is a composite focal length of the first lens group and the second lens group at a telephoto end of the optical imaging system at which the field of view of the optical imaging system is narrowest.

In another general aspect, an optical imaging system includes a first lens group, a second lens group, a third lens group, and a fourth lens group sequentially disposed in ascending numerical order along an optical axis of the optical imaging system from an object side of the optical imaging system toward an imaging plane of the optical imaging system, one lens group among the first lens group to the fourth lens group is configured to be movable along the optical axis to change a focal length of the optical imaging system, another lens group among the first lens group to the fourth lens group is configured to be movable along the optical axis to correct a focal position of the optical imaging system, and the first lens group includes a reflective member configured to change a path of light incident on the reflective member, and at least one lens configured to converge light entering the optical imaging system onto the reflective member.

The first lens group and the third lens group may be disposed at fixed positions on the optical axis, the second lens group may be configured to be movable along the optical axis to change the focal length of the optical imaging system, and the fourth lens group may be configured to be movable along the optical axis to correct the focal position of the optical imaging system as the second lens group moves along the optical axis to change the focal length of the optical imaging system.

The second lens group and the fourth lens group may be further configured to be movable along the optical axis in opposite directions relative to each other as the second lens group moves along the optical axis to change the focal length of the optical imaging system and the fourth lens group moves along the optical axis to correct the focal position of the optical imaging system as the second lens group moves along the optical axis to change the focal length of the optical imaging system.

The other lens group among the first lens group to the fourth lens groups may be further configured to be movable along the optical axis as an object distance changes between infinity and a near distance.

Other features and aspects will be apparent from the following detailed description, the drawings, and the claims

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
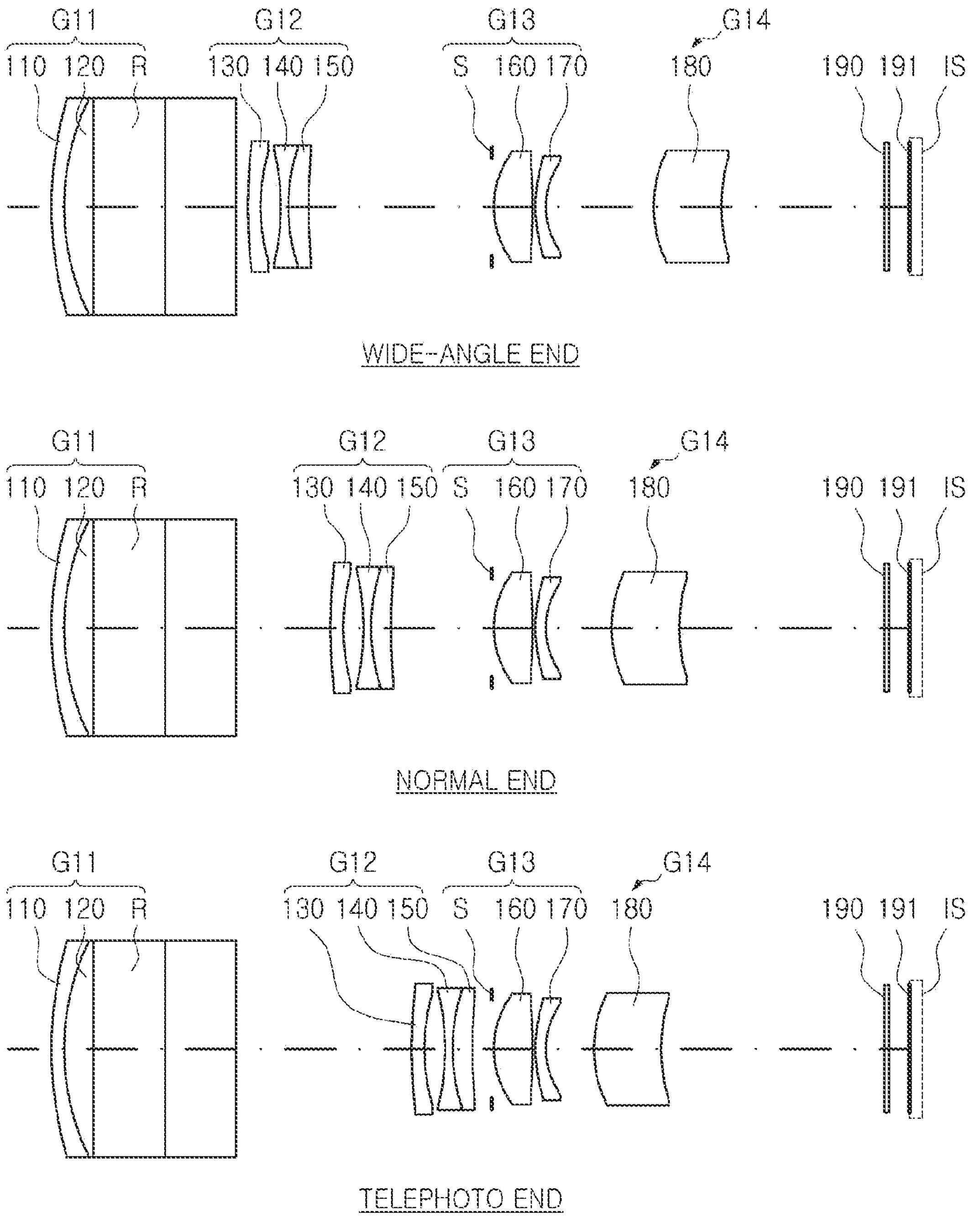
FIG. 1 is an unfolded view illustrating a wide-angle end, a normal end, and a telephoto end of a first example of an optical imaging system when an object distance is infinity.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Use herein of the word "may" in describing the various examples, e.g., as to what an example may include or implement, means that at least one example exists in which such a feature is included or implemented, but not all examples are limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after an understanding of the disclosure of this application. Furthermore, although the examples described herein have a variety of configurations, other configurations are possible as will be apparent after an understanding of the disclosure of this application.

In the drawings, thicknesses, sizes, and shapes of lenses may have been slightly exaggerated for convenience of explanation. In particular, shapes of spherical surfaces or aspherical surfaces illustrated in the drawings are illustrated by way of example. That is, the shapes of the spherical surfaces or the aspherical surfaces are not limited to those illustrated in the drawings.

Examples of an optical imaging system described in this application may be mounted in a mobile electronic device. For example, the optical imaging system may be one component of a camera module mounted in the mobile electronic device. The mobile electronic device may be a portable electronic device such as a mobile communications terminal, a smartphone, or a tablet personal computer (PC).

In the examples described herein, a first lens (or a foremost lens) refers to a lens closest to an object side of the optical imaging system, while a last lens (or a rearmost lens) refers to a lens closest to an imaging plane of the optical imaging system (or an image sensor).

In addition, a first surface of each lens refers to a surface thereof close to the object side of the optical imaging system (or an object-side surface), and a second surface of each lens refers to a surface thereof close to the imaging plane of the optical imaging system (or an image-side surface).

Numerical values of radiuses of curvature, thicknesses, distances, and focal are expressed in millimeters (mm), numerical values of a field of view (FOV) are expressed in degrees, and numerical values of an F-number (Fno) and a magnification (MAG) are dimensionless quantities.

Radiuses of curvature of lens surfaces are measured at the optical axis. Thicknesses of lenses and other optical elements, and distances between lenses and other optical elements, are measured along an optical axis of the imaging lens system.

Unless stated otherwise, a reference to a shape of a lens surface refers to a shape of a paraxial region of the lens surface. A paraxial region of a lens surface is a central portion of the lens surface surrounding and including the optical axis of the lens surface in which light rays incident to the lens surface make a small angle θ to the optical axis, and the approximations $\sin\theta \approx \theta$, $\tan\theta \approx \theta$, and $\cos\theta \approx 1$ are valid.

For example, a statement that an object-side surface of a lens is convex means that at least a paraxial region of the object-side surface of the lens is convex, a statement that an image-side surface of the lens is concave means that at least a paraxial region of the image-side surface of the lens is concave. Therefore, even though the object-side surface of the lens may be described as convex, the entire object-side surface of the lens may not be convex, and a peripheral region of the object-side surface of the lens may be concave. Also, even though the image-side surface of the lens may be described as concave, the entire image-side surface of the lens may not be concave, and a peripheral region of the image-side surface of the lens may be convex.

The imaging plane may refer to a virtual surface on which an image of an object is focused by the optical imaging system. Alternatively, the imaging plane may refer to one surface of the image sensor on which light is received.

Examples of an optical imaging system may include a plurality of lens groups. As an example, the optical imaging system may include a first lens group, a second lens group, a third lens group, and a fourth lens group.

At least some of the first to fourth lens groups may include a plurality of lenses. As an example, the optical imaging system may include at least seven lenses.

In one example, the optical imaging system may include a first lens, a second lens, a third lens, a fourth lens, a fifth lens, a sixth lens, a seventh lens, and an eighth lens sequentially disposed in ascending numerical order along the optical axis of the optical imaging system from the object side of the optical imaging system toward the imaging plane of the optical imaging system.

In another example, the optical imaging system may include a first lens, a second lens, a third lens, a fourth lens, a fifth lens, a sixth lens, and a seventh lens sequentially disposed in ascending numerical order along the optical axis of the optical imaging system from the object side of the optical imaging system toward the imaging plane of the optical imaging system.

The optical imaging system may further include a reflective member having a reflective surface changing a light path. As an example, the reflective member may be a mirror or a prism.

A long light path may be formed in a relatively narrow space by bending the light path with the reflective member.

Accordingly, the optical imaging system may be miniaturized, and may have a long focal length.

In addition, the optical imaging system may further include an image sensor converting an image of an object incident on the image sensor into an electrical signal.

Further, the optical imaging system may further include an infrared cut-off filter (hereinafter, referred to as a filter) cutting off infrared light. The filter may be disposed between the rearmost lens and the image sensor.

In addition, the optical imaging system may further include a stop disposed between the second lens group and the third lens group. In one example, the stop may be disposed between the fifth lens and the sixth lens. In another example, the stop may be disposed between the fourth lens and the fifth lens.

In one example, the first lens group may include a first lens, a second lens, and a reflective member, the second lens group may include a third lens, a fourth lens, and a fifth lens, the third lens group may include a sixth lens and a seventh lens, and the fourth lens group may include an eighth lens. That is, the reflective member may be disposed between the second lens and the third lens. The third lens group may further include the stop disposed in front of the sixth lens.

In another example, the first lens group may include a first lens, a reflective member, and a second lens, the second lens group may include a third lens and a fourth lens, the third lens group may include a fifth lens and a sixth lens, and the fourth lens group may include a seventh lens. That is, the reflective member may be disposed between the first lens and the second lens. The third lens group may further include the stop disposed in front of the fifth lens.

In another example, the first lens group may include a first lens, a second lens, and a reflective member, the second lens group may include a third lens and a fourth lens, the third lens group may include a fifth lens and a sixth lens, and the fourth lens group may include a seventh lens. That is, the reflective member may be disposed between the second lens and the third lens. The third lens group may further include the stop disposed in front of the fifth lens.

Some of the plurality of lenses may be bonded to each other to form one or more bonded lenses. In one example, the first lens and the second lens may be bonded to each other to form a bonded lens, and the fourth lens and the fifth lens may be bonded to each other to form another bonded lens. In another example, the first lens and the second lens may be bonded to each other to form a bonded lens.

At least some of the plurality of lenses may be spaced apart from each other along the optical axis by predetermined intervals.

At least one lens group among the first lens group to the fourth lens group may be configured to be movable in order to change the overall focal length of the optical imaging system.

For example, an interval between the first lens group and the second lens group may be changed in order to change the overall focal length of the optical imaging system. As an example, the first lens group may be disposed at a fixed position, and the second lens group may be configured to be movable in an optical axis direction. As the second lens group is moved away from the object side toward the imaging plane, the overall focal length of the optical imaging system may be changed from a wide-angle end to a telephoto end.

Since the first lens group is positioned at the foremost portion in the optical imaging system, when the first lens group is disposed at a fixed position, it may be easy to implement a waterproof and dustproof optical imaging system.

The first lens group may include a reflective member and at least one lens disposed in front of the reflective member and having a meniscus shape of which an object-side surface is convex, and the first lens group may have a positive refractive power as a whole. In addition, light passing through at least one lens disposed in front of the reflective member may be refracted to converge and be incident on the reflective member.

In one example, the first lens group may include a reflective member and two lenses (e.g., a first lens and a second lens).

At least one of the two lenses may be disposed in front of the reflective member. That is, both the first lens and the second lens may be disposed in front of the reflective member, or the first lens may be disposed in front of the reflective member and the second lens may be disposed behind the reflective member.

Each of the first lens and the second lens may have a meniscus shape of which an object-side surface is convex.

When both the first lens and the second lens are disposed in front of the reflective member, a composite focal length of the first lens and the second lens may have a positive value.

When the first lens is disposed in front of the reflective member, a focal length of the first lens may have a positive value, and a focal length of the second lens may have a negative value.

In addition, the first lens and the second lens may be made of materials having different optical characteristics. For example, the first lens may be made of a material having a high dispersion value, and the second lens may be made of a material having a low dispersion value. Accordingly, a chromatic aberration correction capability of the optical imaging system may be improved.

In one example, an Abbe number of one of the first lens and the second lens may be 50 or more, and an Abbe number of another one of the first lens and the second lens may be 40 or less.

In one example, an Abbe number of a lens having a positive refractive power among the first lens and the second lens may be 50 or more, and an Abbe number of a lens having a negative refractive power among the first lens and the second lens may be 40 or less.

In one example, an average of a refractive index of the first lens and a refractive index of the second lens may exceed 1.7.

The second lens group may include a plurality of lenses, and may have a negative refractive power as a whole.

In one example, the second lens group may include a third lens, a fourth lens, and a fifth lens. Any one of the third to fifth lenses may have a shape of which both surfaces are concave.

For example, the third lens may have a meniscus shape of which an object-side surface is convex, and may have a negative refractive power. The fourth lens may have a shape of which both surfaces are concave, and may have a negative refractive power. The fifth lens may have a meniscus shape of which an object-side surface is convex, and may have a positive refractive power.

In another example, the second lens group may include a third lens and a fourth lens. Either one of the third lens and the fourth lens may have a shape of which both surfaces are concave.

For example, the third lens may have a concave shape of which both surfaces are concave, and may have a negative refractive power. The fourth lens may have a meniscus shape of which an object-side surface is convex, and may have a positive refractive power.

The third lens group may include a stop and a plurality of lenses, and may have a positive refractive power as a whole.

A lens disposed closest to the stop (e.g., a lens positioned immediately behind the stop) among the plurality of lenses included in the third lens group may have a positive refractive power.

A composite focal length of the first lens group and the second lens group may have a negative value. This causes light passing through the first lens group and the second lens group to diverge, so diameters of lenses disposed behind the lens disposed closest to the stop may be decreased by making the lens disposed closest to the stop among the plurality of lenses included in the third lens group to have a positive refractive power.

In addition, the lens disposed closest to the stop (e.g., the lens located immediately behind the stop) may have an aspherical surface.

In one example, the third lens group may include a stop, a sixth lens, and a seventh lens.

The sixth lens may have a shape of which both surfaces are convex, and may have a positive refractive power. The seventh lens may have a meniscus shape of which an object-side surface is convex, and may have a negative refractive power.

In another example, the third lens group may include a stop, a fifth lens, and a sixth lens.

The fifth lens may have a shape of which both surfaces are convex, and may have a positive refractive power. The sixth lens may have a meniscus shape of which an object-side surface is convex, and may have a negative refractive power.

The stop included in the third lens group may be a variable stop having a variable diameter. In this case, power needs to be applied in order to change a diameter of the stop, and accordingly the third lens group may be disposed at a fixed position.

The fourth lens group may include at least one lens, and may have a positive refractive power as a whole.

In one example, the fourth lens group may include an eighth lens, and the eighth lens may have a meniscus shape of which an object-side surface is convex, and may have a positive refractive power.

In another example, the fourth lens group may include a seventh lens, and the seventh lens may have a meniscus shape of which an object-side surface is convex, and may have a positive refractive power.

At least one lens group among the first lens group to the fourth lens group may be configured to be movable in order to correct a focal position according to the change in the overall focal length of the optical imaging system.

For example, the fourth lens group may be configured to be movable in the optical axis direction. As the fourth lens group is moved, an interval between the third lens group and the fourth lens group and an interval between the fourth lens group and the image sensor are changed.

When the overall focal length of the optical imaging system is changed from a wide-angle end to a telephoto end, the fourth lens group may be moved away from the imaging plane toward the object side to correct the focal position.

In addition, when an object distance is changed from infinity to a near distance (e.g., 600 mm), the fourth lens group may be moved away from the imaging plane toward the object side.

The second lens group may be moved along the optical axis to change the overall focal length of the optical imaging system (an optical zoom function), and the fourth lens group may be moved along the optical axis to correct the focal position as the overall focal length of the optical imaging system is changed.

Accordingly, examples of the optical imaging system may have an optical zoom function.

Also, examples of the optical imaging system may have a feature of a telephoto lens having a relatively narrow field of view and a long focal length.

At least one of the plurality of lenses may have an aspherical surface. For example, the lens disposed closest to the stop may have an aspherical surface.

In one example, the third lens group may include the stop. In addition, at least one of an object-side surface and an image-side surface of the lens disposed closest to the stop among the plurality of lenses included in the third lens group may be aspherical.

The lens disposed closest to the stop has a great influence on optical characteristics (e.g., aberration correction) of the optical imaging system, and may thus be configured to have an aspherical surface.

The aspherical surface of the lens may be represented by the following Equation 1:

$$Z = \frac{cY^2}{1+\sqrt{1-(1+K)c^2Y^2}} + AY^4 + BY^6 + CY^8 + DY^{10} \quad (1)$$

In Equation 1, c is a curvature of a lens surface and is equal to a reciprocal of a radius of curvature of the lens surface at an optical axis of the lens surface, K is a conic constant, Y is a distance from any point on the lens surface to the optical axis of the lens surface in a direction perpendicular to the optical axis of the lens surface, A, B, C, and D are aspherical constants, Z (or sag) is a distance in a direction parallel to the optical axis of the lens surface from the point on the lens surface at the distance Y from the optical axis of the lens surface to a tangential plane perpendicular to the optical axis and intersecting a vertex of the lens surface.

Examples of the optical imaging system may satisfy any one or any combination of any two or more of the following Conditional Expressions 1 to 6.

$$0.4 \le D13/TTL \le 0.6 \quad \text{(Condition Expression 1)}$$

$$0.4 \le D13/fG1 \le 0.8 \quad \text{(Condition Expression 2)}$$

$$0.6 \le fGc/fG2 \le 0.9 \quad \text{(Condition Expression 3)}$$

$$-1.8 \le kf/kr \le -1.2 \quad \text{(Condition Expression 4)}$$

$$0.4 \le fG12w/fG12t \le 0.7 \quad \text{(Condition Expression 5)}$$

$$0 \le |Laf/fG4| \le 0.1 \quad \text{(Condition Expression 6)}$$

In an example of the optical imaging system, $0.4 \le D13/TTL \le 0.6$ may be satisfied, where D13 is an optical axis distance from a first surface of the first lens group to the stop, and TTL is an optical axis distance from the first surface of the first lens group to the imaging plane.

A diameter of the stop may be decreased as the stop becomes more distant from the first lens group. Therefore, moving the stop to be more distant from the first lens group may assist in decreasing a thickness of the optical imaging system (or a thickness of the mobile electronic device in which the optical imaging system is disposed (here, the thickness is a thickness of the optical imaging system in a direction perpendicular to the optical axis direction)). However, when the stop becomes excessively distant from the first lens group, there may be a problem that the overall length (e.g., TTL) of the optical imaging system becomes long.

In addition, when the stop is positioned excessively close to the first lens group, a diameter of the stop may increase. When the diameter of the stop increases, an opening of the stop may have a non-circular shape due to a thickness limitation of the optical imaging system, such that Fno may become great, and accordingly an amount of light may decrease, resulting in a dark captured image. Fno is an F-number of the optical imaging system.

Accordingly, $0.4 \leq D13/TTL \leq 0.6$ may be satisfied so that the optical imaging system may have an appropriate Fno, thickness, and overall length.

In another example of the optical imaging system, $0.4 \leq D13/fG1 \leq 0.8$ may be satisfied, where D13 is an optical axis distance from the first surface of the first lens group to the stop, and fG1 is a focal length of the first lens group.

This condition represents a positional relationship between the focal length of the first lens group and the stop. Since the first lens group has a positive refractive power, light passing through the first lens group may be refracted to converge, and the stop needs to be disposed at an appropriate position according to a convergence degree of the light. Accordingly, $0.4 \leq D13/fG1 \leq 0.8$ may be satisfied so that the first lens group may have an appropriate refractive power, and the optical imaging system may have an appropriate Fno, thickness, and overall length.

In another example of the optical imaging system, $0.6 \leq fGc/fG2 \leq 0.9$ may be satisfied, where fGc is a focal length of a lens of which both surfaces are concave among the lenses included in the second lens group, and fG2 is a focal length of the second lens group.

Since the second lens group serves to vary a field of view of the optical imaging system (or to vary the overall focal length of the optical imaging system), an aberration change due to movement of the second lens group needs to be significantly decreased. The second lens group may include a lens of which both surfaces are concave, and the lens of which both surfaces are concave may have a great influence on optical characteristics of the optical imaging system. Accordingly, $0.6 \leq fGc/fG2 \leq 0.9$ may be satisfied so that the second lens group may have an appropriate refractive power to serve to vary the field of view of the optical imaging system (or to vary the overall focal length of the optical imaging system), and the aberration change due to the movement of the second lens group may be significantly decreased.

In another example of the optical imaging system, $-1.8 \leq kf/kr \leq -1.2$ may be satisfied, where kf is a refractive power of the first surface of the fourth lens group, and kr is a refractive power of the last surface of the fourth lens group. The refractive power k of each surface may be defined as $k=c(n'-n)$, where c is a curvature of the surface (i.e., a reciprocal of a radius of curvature of the surface), n' is a refractive index of a medium behind the surface, and n is a refractive index of a medium in front of the surface.

Since the fourth lens group is disposed closest to the imaging plane, the fourth lens group needs to serve as a field flattener (that is, to serve to effectively suppress an imaging plane curvature phenomenon in which the outer portion of a field of view is blurred or curved as a curved surface when it is focused on a plane), and may have a meniscus shape having a weak refractive power. Accordingly, $-1.8 \leq kf/kr \leq -1.2$ may be satisfied so that that the fourth lens group may have an appropriate refractive power to effectively correct imaging plane curvature.

In another example of the optical imaging system, $0.4 \leq fG12w/fG12t \leq 0.7$ may be satisfied, where fG12w is a composite focal length of the first lens group and the second lens group at the wide-angle end, and fG12t is a composite focal length of the first lens group and the second lens group at the telephoto end.

This condition may be a condition for determining a zoom magnification, and in examples of the optical imaging system, the field of view of the optical imaging system may change due to the movement of the second lens group. Accordingly, $0.4 \leq fG12w/fG12t \leq 0.7$ may be satisfied so that the optical imaging system may have an appropriate zoom magnification, and may improve an aberration correction capability.

In another example of the optical imaging system, $0 \leq |Laf/fG4| \leq 0.1$ may be satisfied, where Laf is a movement amount of the fourth lens group when the object distance changes from infinity to a near distance (e.g., 600 mm) at the telephoto end, and fG4 is a focal length of the fourth lens group.

Since the fourth lens group is disposed closest to the imaging plane, the fourth lens group needs to serve as a field flattener as discussed above. Accordingly, $0 \leq |Laf/fG4| \leq 0.1$ may be satisfied so that imaging plane curvature may be effectively corrected.

Figure 2:
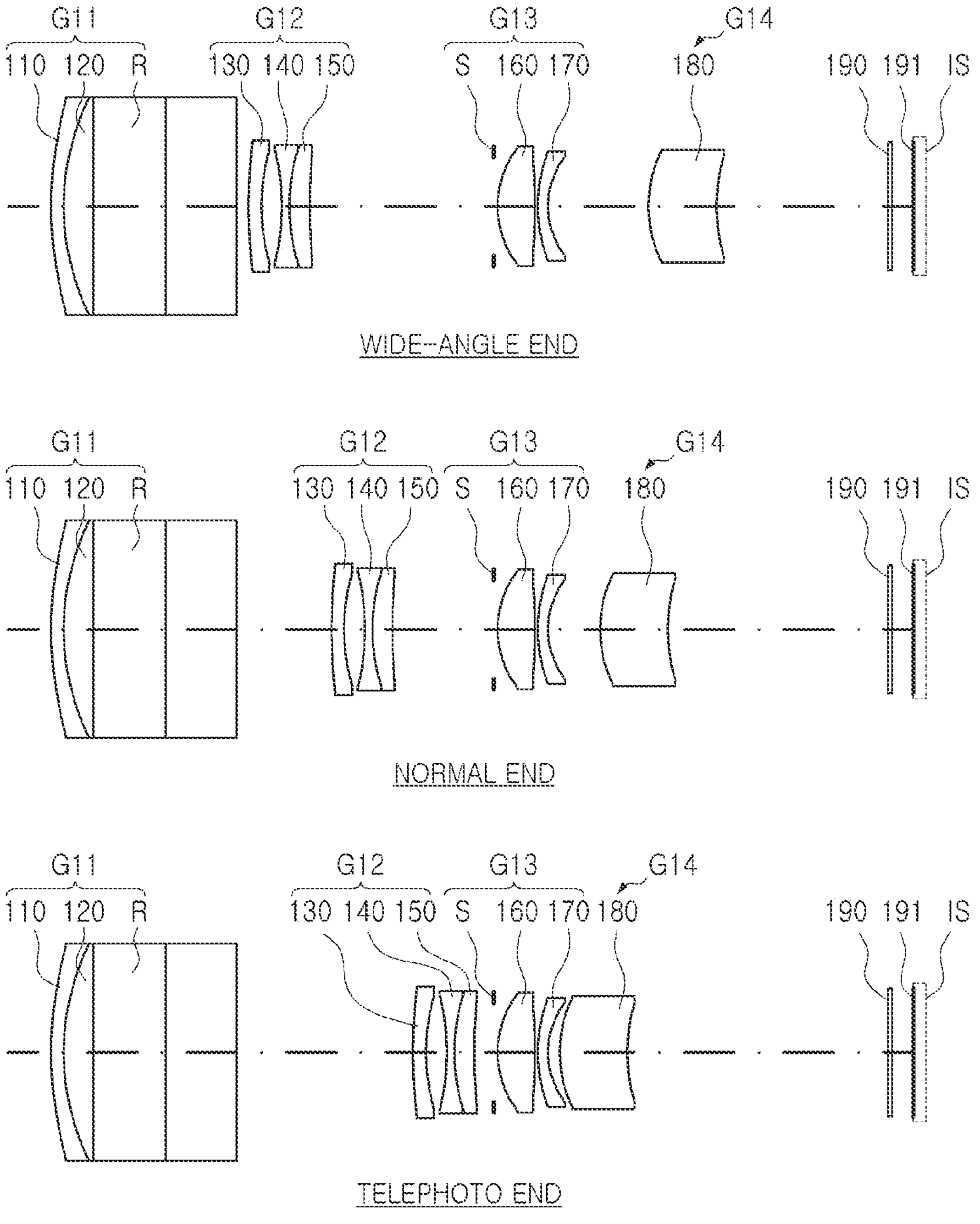
FIG. 2 is an unfolded view illustrating the wide-angle end, the normal end, and the telephoto end of the first example of the optical imaging system when the object distance is a near distance (600 mm).

FIG. 1 is an unfolded view illustrating a wide-angle end, a normal end, and a telephoto end of a first example of an optical imaging system when an object distance is infinity, and FIG. 2 is unfolded view illustrating the wide-angle end, the normal end, and the telephoto end of the first example of the optical imaging system when the object distance is a near distance (600 mm).

Referring to FIGS. 1 and 2, the first example of the optical imaging system may include a first lens group G11, a second lens group G12, a third lens group G13, and a fourth lens group G14.

In order from an object side, the first lens group G11 may include a first lens 110, a second lens 120, and a reflective member R, the second lens group G12 may include a third lens 130, a fourth lens 140, and a fifth lens 150, the third lens group G13 may include a stop S, a sixth lens 160, and a seventh lens 170, and the fourth lens group G14 may include an eighth lens 180.

In addition, the optical imaging system may further include a filter 190 and an image sensor IS.

The optical imaging system may focus an image on an imaging plane 191. The imaging plane 191 may refer to a surface on which an image is focused by the optical imaging system. As an example, the imaging plane 191 may refer to one surface of the image sensor IS on which light is received.

The reflective member R may be a prism, but may alternatively be a mirror.

At least one of the first lens group G11 to the fourth lens group G14 may be moved in order to change an overall focal length of the optical imaging system. As an example, the first lens group G11 and the third lens group G13 are fixed, and the second lens group G12 is moved along the optical axis to change the overall focal length of the optical imaging system. That is, as the second lens group G12 is moved from the object side toward the image side, the overall focal length of the optical imaging system may be changed from the wide-angle end to the telephoto end.

In addition, at least one of the first lens group G11 to the fourth lens group G14 may be moved in order to correct a focal position according to the change in the overall focal length of the optical imaging system. As an example, when the overall focal length of the optical imaging system is changed from the wide-angle end to the telephoto end, the fourth lens group G14 may be moved from the image side toward the object side to correct the focal position.

In addition, when the object distance is changed from infinity to the near distance (e.g., 600 mm), the fourth lens group G14 may be moved from the image side toward the object side.

Optical characteristics (radii of curvature, thicknesses of lenses or distances between the lenses, refractive indices, Abbe numbers, and focal lengths) of each element in the first example are listed in Table 1 below.

In Table 2, DO is an object distance, D1 is an optical axis distance between the reflective member R and the third lens 130, D2 is an optical axis distance between the fifth lens 150 and the stop S, D3 is an optical axis distance between the seventh lens 170 and the eighth lens 180, and D4 is an optical axis distance between the eighth lens 180 and the filter 190.

f is an overall focal length of the optical imaging system, MAG is a magnification of the optical imaging system, FOV is a field of view of the optical imaging system, Fno is an F-number of the optical imaging system, and TTL is an optical axis distance from an object-side surface of the first lens 110 to the imaging plane 191.

A focal length fG1 of the first lens group G11 may be 26.9778 mm, a focal length fG2 of the second lens group G12 may be −7.37 mm, a focal length fG3 of the third lens group G13 may be 10.5996 mm, and a focal length fG4 of the fourth lens group G14 may be 22.3592 mm.

A composite focal length fG12w of the first lens group G11 and the second lens group G12 at the wide-angle end may be −14.9327 mm, and a composite focal length fG12t of the first lens group G11 and the second lens group G12 at the telephoto end may be −29.2539 mm.

TABLE 1

| Surface No. | Element | Radius of Curvature | Thickness or Distance | Refractive Index | Abbe Number | Focal Length |
|---|---|---|---|---|---|---|
| Object | | | D0 | | | |
| S1 | First Lens | 17.733 | 0.5 | 1.84666 | 23.78 | −33.9233 |
| S2 | Second | 10.862 | 1.2 | 1.72916 | 54.67 | 14.8319 |
| S3 | Lens | infinity | 0 | | | |
| S4 | Prism | infinity | 2.8 | 1.5168 | 64.21 | |
| S5 | | infinity | 2.8 | 1.5168 | 64.21 | |
| S6 | | infinity | D1 | | | |
| S7 | Third | 22.135 | 0.5 | 1.59349 | 67 | −25.3725 |
| S8 | Lens | 8.905 | 0.811 | | | |
| S9 | Fourth Lens | −10.453 | 0.3 | 1.8061 | 40.73 | −5.4814 |
| S10 | Fifth | 7.831 | 0.8 | 1.94594 | 17.98 | 11.0679 |
| S11 | Lens | 28.435 | D2 | | | |
| S12 | Stop | infinity | 0.1 | | | |
| S13 | Sixth | 3.966 | 1.5 | 1.6779 | 54.9 | 5.2394 |
| S14 | Lens | −30.040 | 0.1 | | | |
| S15 | Seventh | 7.036 | 0.4 | 1.84666 | 23.78 | −7.7266 |
| S16 | Lens | 3.318 | D3 | | | |
| S17 | Eighth | 5.629 | 2.68 | 1.5312 | 56.51 | 22.3592 |
| S18 | Lens | 8.895 | D4 | | | |
| S19 | Filter | infinity | 0.21 | 1.5168 | 64.2 | |
| S20 | | infinity | 0.1 | | | |
| S21 | Imaging Plane | Infinity | | | | |

Table 2 below lists various other optical characteristics in the first example.

TABLE 2

| | Infinity | | | | Near Distance (600 mm) | | |
|---|---|---|---|---|---|---|---|
| | Wide-angle End | Normal End | Telephoto End | | Wide-angle End | Normal End | Telephoto End |
| D0 | Infinity | Infinity | Infinity | D0 | 600 | 600 | 600 |
| D1 | 0.5 | 3.75746 | 7.0183 | D1 | 0.5 | 3.75746 | 7.0183 |
| D2 | 7.2919 | 4.03444 | 0.7736 | D2 | 7.2919 | 4.03444 | 0.7736 |
| D3 | 4.29201 | 2.65608 | 1.98512 | D3 | 4.01854 | 2.05234 | 0.49876 |
| D4 | 7.12219 | 8.75812 | 9.42908 | D4 | 7.39566 | 9.36186 | 10.91544 |
| f | 11.203 | 17.405 | 27.5083 | MAG | 0.01833 | 0.02862 | 0.04674 |
| FOV | 13.519° | 8.491° | 5.307° | FOV | 13.395° | 8.279° | 4.959° |
| Fno | 3.697 | 3.905 | 4.006 | Fno | 3.726 | 3.998 | 4.279 |
| TTL | 34.007 | 34.007 | 34.007 | TTL | 34.007 | 34.007 | 34.007 |

A refractive power kf of a first surface (e.g., an object-side surface of the eighth lens 180) of the fourth lens group G14 may be 0.0944 mm, and a refractive power kr of a last surface (e.g., an image-side surface of the eighth lens 180) of the fourth lens group G14 may be −0.0597 mm.

In the first example, the first lens group G11 may have a positive refractive power as a whole, the second lens group G12 may have a negative refractive power as a whole, the third lens group G13 may have a positive refractive power as a whole, and the fourth lens group G14 may have a positive refractive power as a whole.

The first lens 110 may have a negative refractive power, and a first surface thereof may be convex and a second surface thereof may be concave.

The second lens 120 may have a positive refractive power, and a first surface thereof may be convex and a second surface thereof may be flat.

The first lens 110 and the second lens 120 may be bonded to each other to form a bonded lens.

The reflective member R may be disposed behind the second lens 120.

The third lens 130 may have a negative refractive power, and a first surface thereof may be convex and a second surface thereof may be concave.

The fourth lens 140 may have a negative refractive power, and a first surface and a second surface thereof may be concave.

The fifth lens 150 may have a positive refractive power, and a first surface thereof may be convex and a second surface thereof may be concave.

The fourth lens 140 and the fifth lens 150 may be bonded to each other to form another bonded lens.

The sixth lens 160 may have a positive refractive power, and a first surface and a second surface thereof may be convex. The stop S may be disposed in front of the sixth lens 160.

The seventh lens 170 may have a negative refractive power, and a first surface thereof may be convex and a second surface thereof may be concave.

The eighth lens 180 may have a positive refractive power, and a first surface thereof may be convex and a second surface thereof may be concave.

The first surface of the sixth lens 160 may have aspherical coefficients as illustrated in Table 3 below. That is, an object-side surface of the sixth lens 160 may be aspherical.

TABLE 3

| | S13 |
|---|---|
| Conic Constant (K) | −0.51693 |
| 4th-Order Coefficient (A) | −3.805358E−04 |
| 6th-Order Coefficient (B) | 2.481040E−05 |
| 8th-Order Coefficient (C) | −5.132311E−06 |
| 10th-Order Coefficient (D) | 1.189786E−07 |

Figure 3:
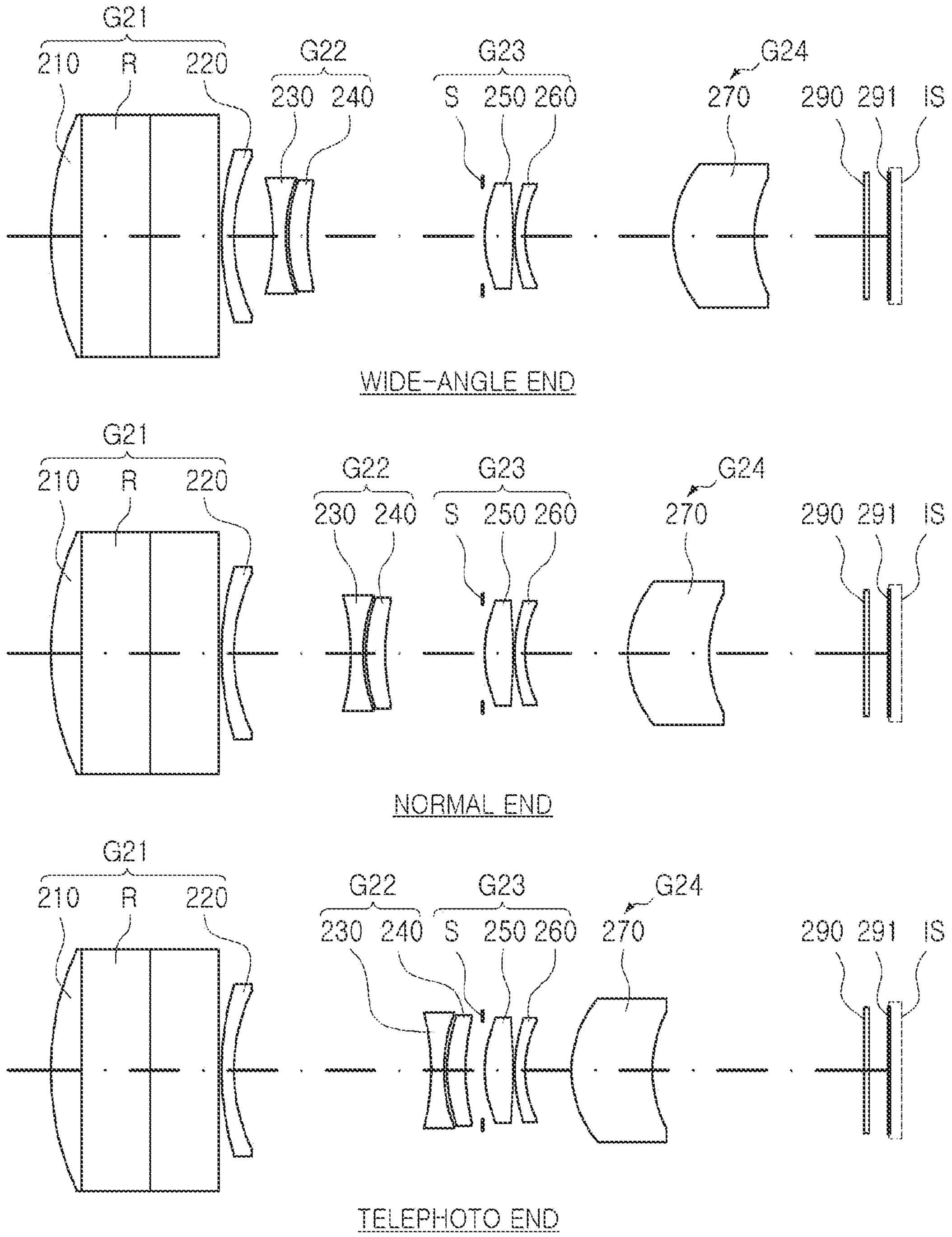
FIG. 3 is an unfolded view illustrating a wide-angle end, a normal end, and a telephoto end of a second example of an optical imaging system when the object distance is infinity.
Figure 4:
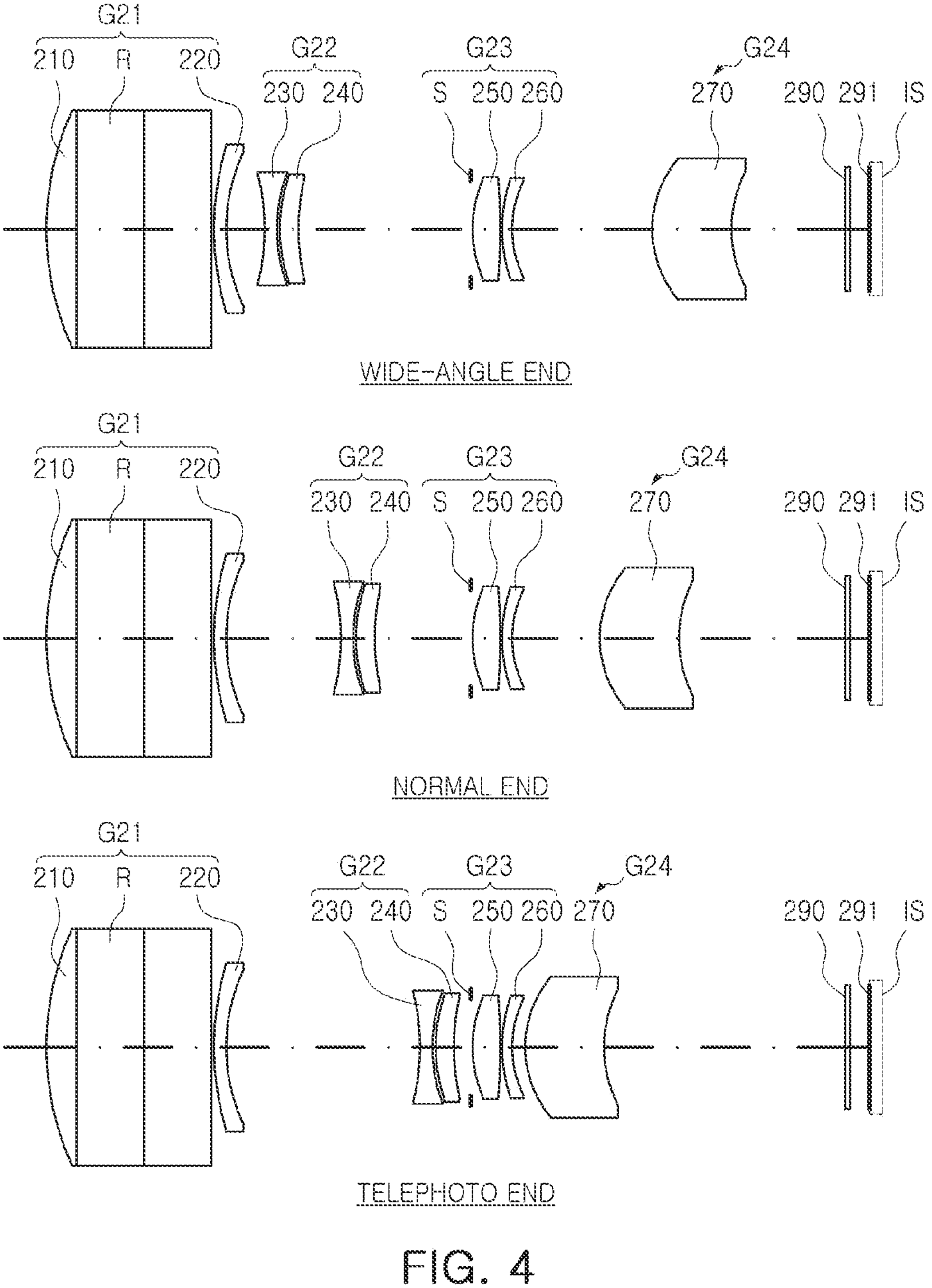
FIG. 4 is an unfolded view illustrating the wide-angle end, the normal end, and the telephoto end of the second example of the optical imaging system when the object distance is a near distance (600 mm).

FIG. 3 is an unfolded view illustrating a wide-angle end, a normal end, and a telephoto end of a second example of an optical imaging system when an object distance is infinity, and FIG. 4 is an unfolded view illustrating the wide-angle end, the normal end, and the telephoto end of the second example of the optical imaging system when the object distance is a near distance (600 mm).

Referring to FIGS. 3 and 4, the second example of the optical imaging system may include a first lens group G21, a second lens group G22, a third lens group G23, and a fourth lens group G24.

In order from an object side, the first lens group G21 may include a first lens 210, a reflective member R, and a second lens 220, the second lens group G22 may include a third lens 230 and a fourth lens 240, the third lens group G23 may include a stop S, a fifth lens 250, and a sixth lens 260, and the fourth lens group G24 may include a seventh lens 270.

In addition, the optical imaging system may further include a filter 290 and an image sensor IS.

The optical imaging system may focus an image on an imaging plane 291. The imaging plane 291 may refer to a surface on which an image is focused by the optical imaging system. As an example, the imaging plane 291 may refer to one surface of the image sensor IS on which light is received.

The reflective member R may be a prism, but may alternatively be a mirror.

At least one of the first lens group G21 to the fourth lens group G24 may be moved in order to change an overall focal length of the optical imaging system. As an example, the first lens group G21 and the third lens group G23 are fixed, and the second lens group G22 is moved along the optical axis to change the overall focal length of the optical imaging system. That is, as the second lens group G22 is moved from the object side toward the image side, the overall focal length of the optical imaging system may be changed from the wide-angle end to the telephoto end.

In addition, at least one of the first lens group G21 to the fourth lens group G24 may be moved in order to correct a focal position according to the change in the overall focal length of the optical imaging system. As an example, when the overall focal length of the optical imaging system is changed from the wide-angle end to the telephoto end, the fourth lens group G24 may be moved from the image side toward the object side to correct the focal position.

In addition, when the object distance is changed from infinity to the near distance (e.g., 600 mm), the fourth lens group G24 may be moved from the image side toward the object side.

Optical characteristics (radii of curvature, thicknesses of lenses or distances between the lenses, refractive indices, Abbe numbers, and focal lengths) of each element in the second example are listed in Table 4 below.

TABLE 4

| Surface No. | Element | Radius of Curvature | Thickness or Distance | Refractive Index | Abbe Number | Focal Length |
|---|---|---|---|---|---|---|
| Object | | | D0 | | | |
| S1 | First Lens | 12.533 | 1.2 | 1.6779 | 54.9 | 18.4078 |
| S2 | Prism | infinity | 2.8 | 1.5168 | 64.21 | |
| S3 | | infinity | 2.8 | 1.5168 | 64.21 | |
| S4 | | infinity | 0.1 | | | |
| S5 | Second | 11.970 | 0.5 | 1.94594 | 17.98 | −24.9868 |

TABLE 4-continued

| Surface No. | Element | Radius of Curvature | Thickness or Distance | Refractive Index | Abbe Number | Focal Length |
|---|---|---|---|---|---|---|
| S6 | Lens | 7.817 | D1 | | | |
| S7 | Third | −8.699 | 0.5 | 1.6779 | 54.9 | −5.3619 |
| S8 | Lens | 6.437 | 0.1 | | | |
| S9 | Fourth | 6.818 | 0.8 | 1.94594 | 17.98 | 16.2933 |
| S10 | Lens | 11.409 | D2 | | | |
| S11 | Stop | infinity | 0.1 | | | |
| S12 | Fifth | 5.276 | 1.1 | 1.6779 | 54.9 | 6.7306 |
| S13 | Lens | −31.912 | 0.1 | | | |
| S14 | Sixth | 6.684 | 0.4 | 1.94594 | 17.98 | −15.1429 |
| S15 | Lens | 4.442 | D3 | | | |
| S16 | Seventh | 4.593 | 3.271 | 1.5312 | 56.51 | 20.4823 |
| S17 | Lens | 5.961 | D4 | | | |
| S18 | Filter | infinity | 0.21 | 1.5168 | 64.2 | |
| S19 | | infinity | 0.1 | | | |
| S20 | Imaging Plane | infinity | | | | |

Table 5 below lists various other optical characteristics in the second example.

TABLE 5

| | Infinity | | | | Near Distance (600 mm) | | |
|---|---|---|---|---|---|---|---|
| | Wide-angle End | Normal End | Telephoto End | | Wide-angle End | Normal End | Telephoto End |
| D0 | Infinity | Infinity | Infinity | D0 | 600 | 600 | 600 |
| D1 | 1.5949 | 4.8161 | 8.0373 | D1 | 1.5949 | 4.8161 | 8.0373 |
| D2 | 7.1424 | 3.9212 | 0.7 | D2 | 7.1424 | 3.9212 | 0.7 |
| D3 | 6.01695 | 4.17129 | 1.87675 | D3 | 5.7513 | 3.63073 | 0.5 |
| D4 | 5.16455 | 7.01043 | 9.3048 | D4 | 5.43021 | 7.55114 | 10.68156 |
| f | 11.2 | 16.7992 | 27.4993 | MAG | 0.01821 | 0.02742 | 0.04692 |
| FOV | 13.725° | 8.8° | 5.286° | FOV | 13.591° | 8.59° | 4.905° |
| Fno | 3.273 | 3.5 | 3.905 | Fno | 3.299 | 3.583 | 4.215 |
| TTL | 34 | 34 | 34 | TTL | 34 | 34 | 34 |

In Table 5, DO is an object distance, D1 is an optical axis distance between the second lens 220 and the third lens 230, D2 is an optical axis distance between the fourth lens 240 and the stop S, D3 is an optical axis distance between the sixth lens 260 and the seventh lens 270, and D4 is an optical axis distance between the seventh 270 and the filter 290.

f is an overall focal length of the optical imaging system, MAG is a magnification of the optical imaging system, FOV is a field of view of the optical imaging system, Fno is an F-number of the optical imaging system, and TTL is an optical axis distance from an object-side surface of the first lens 210 to the imaging plane 291.

A focal length fG1 of the first lens group G21 may be 38.7741 mm, a focal length fG2 of the second lens group G22 may be −7.7549 mm, a focal length fG3 of the third lens group G23 may be 10.4556 mm, and a focal length fG4 of the fourth lens group G24 may be 20.4823 mm.

A composite focal length fG12w of the first lens group G21 and the second lens group G22 at the wide-angle end may be −16.2723 mm, and a composite focal length fG12t of the first lens group G21 and the second lens group G22 at the telephoto end may be −24.9821 mm.

A refractive power kf of a first surface (e.g., an object-side surface of the seventh lens 270) of the fourth lens group G24 may be 0.1157 mm, and a refractive power kr of a last surface (e.g., an image-side surface of the seventh lens 270) of the fourth lens group G24 may be −0.0891 mm.

In the second example, the first lens group G21 may have a positive refractive power as a whole, the second lens group G22 may have a negative refractive power as a whole, the third lens group G23 may have a positive refractive power as a whole, and the fourth lens group G24 may have a positive refractive power as a whole.

The first lens 210 may have a positive refractive power, and a first surface thereof may be convex and a second surface thereof may be flat.

The second lens 220 may have a negative refractive power, and a first surface thereof may be convex and a second surface thereof may be concave.

The reflective member R may be disposed between the first lens 210 and the second lens 220.

The third lens 230 may have a negative refractive power, and a first surface and a second surface thereof may be concave.

The fourth lens 240 may have a positive refractive power, and a first surface thereof may be convex and a second surface thereof may be concave.

The fifth lens 250 may have a positive refractive power, and a first surface and a second surface thereof may be convex. The stop S may be disposed in front of the fifth lens 250.

The sixth lens 260 may have a negative refractive power, and a first surface thereof may be convex and a second surface thereof may be concave.

The seventh lens 270 may have a positive refractive power, and a first surface thereof may be convex and a second surface thereof may be concave.

The first surface of the fifth lens 250 may have aspherical coefficients as illustrated in Table 6 below. That is, an object-side surface of the fifth lens 250 may be aspherical.

TABLE 6

| | S12 |
|---|---|
| Conic Constant (K) | −0.34792 |
| 4th-Order Coefficient (A) | −3.390915E−04 |
| 6th-Order Coefficient (B) | −2.210576E−05 |
| 8th-Order Coefficient (C) | −1.690132E−06 |
| 10th-Order Coefficient (D) | 9.416985E−09 |

Figure 5:
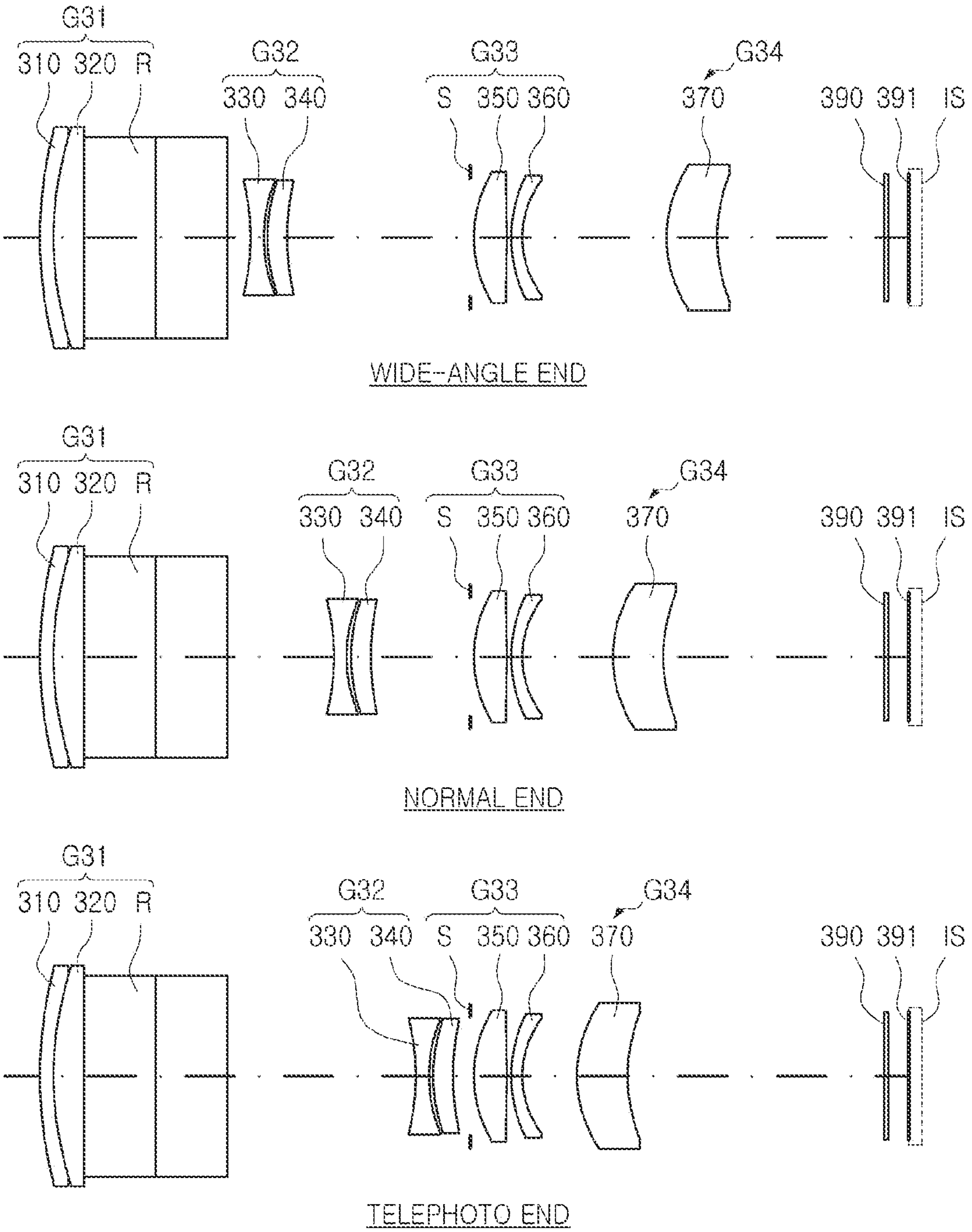
FIG. 5 is an unfolded view illustrating a wide-angle end, a normal end, and a telephoto end of a third example of an optical imaging system when the object distance is infinity.
Figure 6:
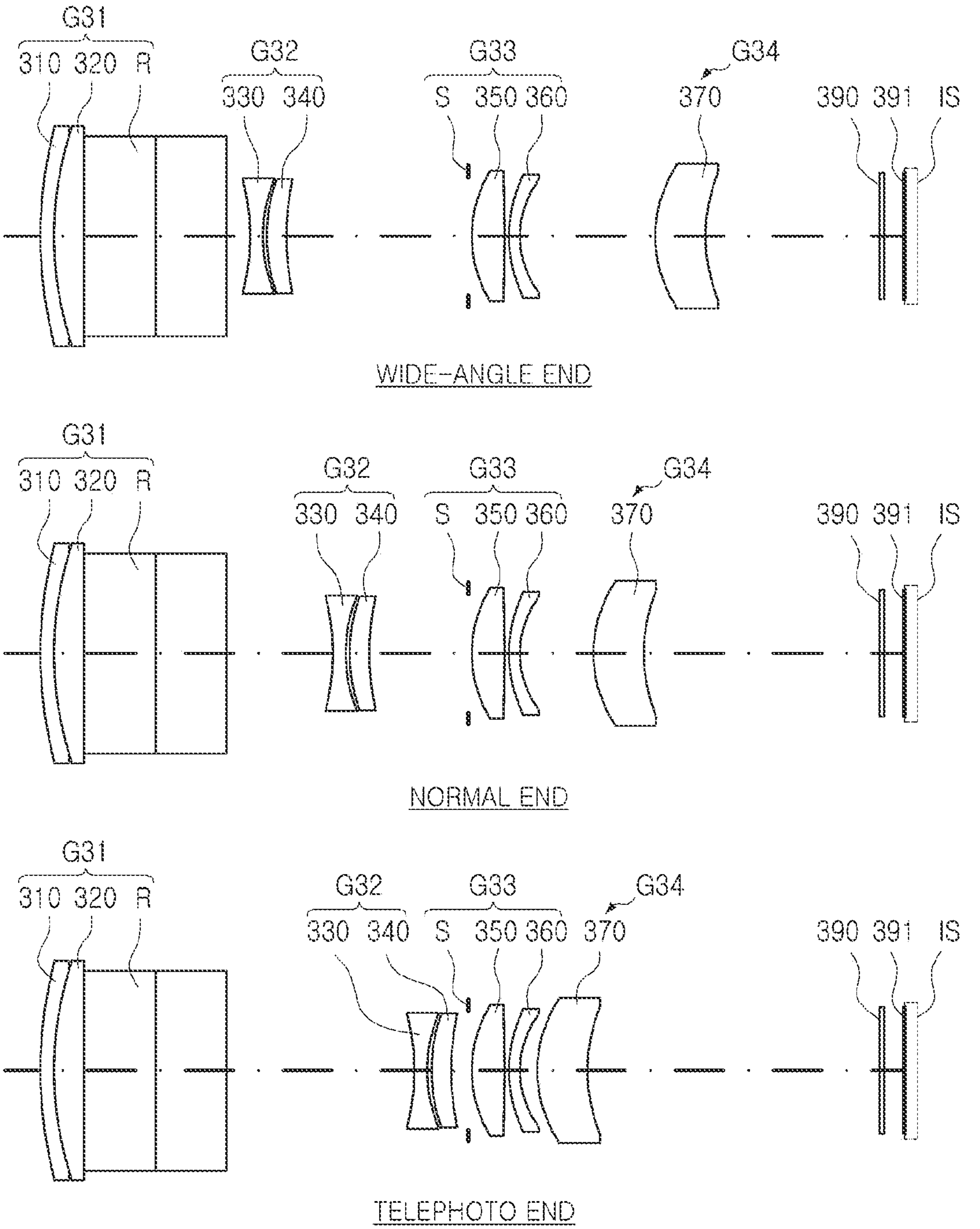
FIG. 6 is an unfolded view illustrating the wide-angle end, the normal end, and the telephoto end of the third example of the optical imaging system when the object distance is a near distance (600 mm).

FIG. 5 is an unfolded view illustrating a wide-angle end, a normal end, and a telephoto end of a third example of an optical imaging system when an object distance is infinity, and FIG. 6 is an unfolded view illustrating the wide-angle end, the normal end, and the telephoto end of the third example of the optical imaging system when the object distance is a near distance (600 mm).

Referring to FIGS. 5 and 6, the third example of the optical imaging system may include a first lens group G31, a second lens group G32, a third lens group G33, and a fourth lens group G34.

In order from an object side, the first lens group G31 may include a first lens 310, a second lens 320, and a reflective member R, the second lens group G32 may include a third lens 330 and a fourth lens 340, the third lens group G33 may include a stop S, a fifth lens 350, and a sixth lens 360, and the fourth lens group G34 may include a seventh lens 370.

In addition, the optical imaging system may further include a filter 390 and an image sensor IS.

The optical imaging system may focus an image on an imaging plane 391. The imaging plane 391 may refer to a surface on which an image is focused by the optical imaging system. As an example, the imaging plane 391 may refer to one surface of the image sensor IS on which light is received.

The reflective member R may be a prism, but may alternatively be a mirror.

At least one of the first lens group G31 to the fourth lens group G34 may be moved in order to change an overall focal length of the optical imaging system. As an example, the first lens group G31 and the third lens group G33 are fixed and the second lens group G32 is moved along the optical axis to change the overall focal length of the optical imaging system. That is, as the second lens group G32 is moved from the object side toward the image side, the overall focal length of the optical imaging system may be changed from the wide-angle end to the telephoto end.

In addition, at least one of the first lens group G31 to the fourth lens group G34 may be moved in order to correct a focal position according to the change in the overall focal length of the optical imaging system. As an example, when the overall focal length of the optical imaging system is changed from the wide-angle end to the telephoto end, the fourth lens group G34 may be moved from the image side toward the object side to correct the focal position.

In addition, when the object distance is changed from infinity to the near distance (e.g., 600 mm), the fourth lens group G34 may be moved from the image side toward the object side.

Optical characteristics (radii of curvature, thicknesses of lenses or distances between the lenses, refractive indices, Abbe numbers, and focal lengths) of each element of the third example are listed in Table 7 below.

TABLE 7

| Surface No. | Element | Radius of Curvature | Thickness or Distance | Refractive Index | Abbe Number | Focal Length |
|---|---|---|---|---|---|---|
| Object | | | D0 | | | |
| S1 | First Lens | 17.878 | 0.5 | 1.94594 | 17.98 | −51.7542 |
| S2 | Second | 12.961 | 1.2 | 1.72916 | 54.67 | 17.6981 |
| S3 | Lens | infinity | 0 | | | |
| S4 | Prism | infinity | 2.8 | 1.5168 | 64.21 | |
| S5 | | infinity | 2.8 | 1.5168 | 64.21 | |
| S6 | | infinity | D1 | | | |
| S7 | Third | −9.012 | 0.5 | 1.6779 | 54.9 | −5.1197 |
| S8 | Lens | 5.812 | 0.126 | | | |
| S9 | Fourth | 6.507 | 0.8 | 1.94594 | 17.98 | 15.7395 |
| S10 | Lens | 10.756 | D2 | | | |
| S11 | Stop | infinity | 0.1 | | | |
| S12 | Fifth | 4.725 | 1.3 | 1.6779 | 54.9 | 6.4154 |
| S13 | Lens | −51.351 | 0.181 | | | |
| S14 | Sixth | 5.483 | 0.4 | 1.94594 | 17.98 | −12.8695 |
| S15 | Lens | 3.660 | D3 | | | |
| S16 | Seventh | 5.255 | 1.98 | 1.5312 | 56.51 | 24.9239 |
| S17 | Lens | 7.551 | D4 | | | |
| S18 | Filter | infinity | 0.21 | 1.5168 | 64.2 | |
| S19 | | infinity | 0.1 | | | |
| S20 | Imaging Plane | infinity | 0 | | | |

Table 8 below lists various other optical characteristics in the third example.

TABLE 8

| | Infinity | | | | Near | | |
|---|---|---|---|---|---|---|---|
| | Wide-angle End | Normal End Wide-angle | Telephoto End Wide-angle | | Wide-angle End | Normal End Wide-angle | Telephoto End Wide-angle |
| D0 | Infinity | Infinity | Infinity | D0 | 600 | 600 | 600 |
| D1 | 0.94283 | 4.18112 | 7.41915 | D1 | 0.94283 | 4.18112 | 7.41915 |
| D2 | 7.17632 | 3.93802 | 0.7 | D2 | 7.17632 | 3.93802 | 0.7 |
| D3 | 5.62102 | 3.54414 | 2.20446 | D3 | 5.32119 | 2.91772 | 0.68085 |
| D4 | 7.25998 | 9.33686 | 10.67654 | D4 | 7.55981 | 9.96328 | 12.20015 |
| f | 11.1987 | 17.2205 | 27.4942 | MAG | 0.01832 | 0.02827 | 0.04658 |
| FOV | 13.598° | 8.62° | 5.325° | FOV | 13.506° | 8.443° | 5.014° |
| Fno | 3.64 | 3.832 | 4.003 | Fno | 3.661 | 3.907 | 4.246 |
| TTL | 33.997 | 33.997 | 33.997 | TTL | 33.997 | 33.997 | 33.997 |

In Table 8, D0 is an object distance, D1 is an optical axis distance between the reflective member R and the third lens 330, D2 is an optical axis distance between the fourth lens 340 and the stop S, D3 is an optical axis distance between the sixth lens 360 and the seventh lens 370, and D4 is an optical axis distance between the seventh lens 370 and the filter 390.

f is an overall focal length of the optical imaging system, MAG is a magnification of the optical imaging system, FOV is a field of view of the optical imaging system, Fno is an F-number of the optical imaging system, and TTL is an optical axis distance from an object-side surface of the first lens 310 to the imaging plane 391.

A focal length fG1 of the first lens group G31 may be 27.4666 mm, a focal length fG2 of the second lens group G32 may be −7.3579 mm, a focal length fG3 of the third lens group G33 may be 10.2712 mm, and a focal length fG4 of the fourth lens group G34 may be 24.9239 mm.

A composite focal length fG12w of the first lens group G31 and the second lens group G32 at the wide-angle end may be −14.357 mm, and a composite focal length fG12t of the first lens group G31 and the second lens group G32 at the telephoto end may be −26.591 mm.

A refractive power kf of a first surface (e.g., an object-side surface of the seventh lens 370) of the fourth lens group G34 may be 0.1011 mm, and a refractive power kr of a last surface (e.g., an image-side surface of the seventh lens 370) of the fourth lens group G34 may be −0.0703 mm.

In the third example, the first lens group G31 may have a positive refractive power as a whole, the second lens group G32 may have a negative refractive power as a whole, the third lens group G33 may have a positive refractive power as a whole, and the fourth lens group G34 may have a positive refractive power as a whole.

The first lens 310 may have a negative refractive power, and a first surface thereof may be convex and a second surface thereof may be concave.

The second lens 320 may have a positive refractive power, and a first surface thereof may be convex and a second surface thereof may be flat.

The first lens 310 and the second lens 320 may be bonded to each other to form a bonded lens.

The reflective member R may be disposed behind the second lens 320.

The third lens 330 may have a negative refractive power, and a first surface and a second surface thereof may be concave.

The fourth lens 340 may have a positive refractive power, and a first surface thereof may be convex and a second surface thereof may be concave.

The fifth lens 350 may have a positive refractive power, and a first surface and a second surface thereof may be convex. The stop S may be disposed in front of the fifth lens 350.

The sixth lens 360 may have a negative refractive power, and a first surface thereof may be convex and a second surface thereof may be concave.

The seventh lens 370 may have a positive refractive power, and a first surface thereof may be convex and a second surface thereof may be concave.

The second surface of the fifth lens 350 may have aspherical coefficients as illustrated in Table 9 below. That is, an image-side surface of the fifth lens 350 may be aspherical.

TABLE 9

| | S13 |
|---|---|
| Conic Constant (K) | −0.3551 |
| 4th-Order Coefficient (A) | −2.962413E−04 |
| 6th-Order Coefficient (B) | −1.479960E−05 |
| 8th-Order Coefficient (C) | 2.944110E−06 |
| 10th-Order Coefficient (D) | −8.737973E−08 |

Table 10 below lists values of fG1, fG2, fG3, fG4, fGc, fG12w, fG12t, kf, kr, Laf, D13, and TTL as well as the values of the quantities of D13/TTL, D13/fG1, fGc/fG2, kf/kr, fG12w/fG12t, and Laf/fG4 in Conditional Expressions 1 to 6 for the first to third examples. As can be seen from Table 10, all of the first to third examples satisfy all of Conditional Expressions 1 to 6.

TABLE 10

| Quantity | Example 1 | Example 2 | Example 3 |
|---|---|---|---|
| fG1 | 26.9778 | 38.7741 | 27.4666 |
| fG2 | −7.37 | −7.7549 | −7.3579 |
| fG3 | 10.5996 | 10.4556 | 10.2712 |
| fG4 | 22.3592 | 20.4823 | 24.9239 |

TABLE 10-continued

| Quantity | Example 1 | Example 2 | Example 3 |
|---|---|---|---|
| fGc | −5.4814 | −5.3619 | −5.1197 |
| fG12w | −14.9327 | −16.2723 | −14.357 |
| fG12t | −29.2539 | −24.9821 | −26.591 |
| kf | 0.0944 | 0.1157 | 0.1011 |
| kr | −0.0597 | −0.0891 | −0.0703 |
| Laf | 1.48636 | 1.37675 | 1.52361 |
| D13 | 17.5029 | 17.5373 | 16.84545 |
| TTL | 34.007 | 34 | 33.997 |
| D13/TTL | 0.51469 | 0.51580 | 0.49550 |
| D13/fG1 | 0.64879 | 0.45229 | 0.61331 |
| fGc/fG2 | 0.74374 | 0.69142 | 0.69581 |
| kf/kr | −1.58124 | −1.29854 | −1.43812 |
| fG12w/fG12t | 0.51045 | 0.65136 | 0.53992 |
| Laf/fG4 | 0.06648 | 0.06722 | 0.06113 |

As described above, the examples of the optical imaging system described above may implement a zoom function by changing a focal length.

While this disclosure includes specific examples, it will be apparent after an understanding of the disclosure of this application that various changes in form and details may be made in these examples be made in these examples without departing from the spirit and scope of the claims and their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:

a first lens group, a second lens group, a third lens group, and a fourth lens group sequentially disposed in ascending numerical order along an optical axis of the optical imaging system from an object side of the optical imaging system toward an imaging plane of the optical imaging system, wherein at least one lens group among the first lens group to the fourth lens group is configured to be movable along the optical axis, the first lens group has a positive refractive power and comprises a reflective member and at least one lens disposed between the object side of the optical imaging system and the reflective member, and the at least one lens is configured to refract light passing through the at least one lens to converge the light to be incident on the reflective member.

2. The optical imaging system of claim 1, wherein the at least one lens of the first lens group comprises a first lens and a second lens sequentially disposed in ascending numerical order along the optical axis from the object side of the optical imaging system toward the imaging plane of the optical imaging system, the first lens is disposed between the object side of the optical imaging system and the reflective member, and the second lens is disposed either between the object side of the optical imaging system and the reflective member, or between the reflective member and the second lens group.

3. The optical imaging system of claim 2, wherein an Abbe number of one of the first lens and the second lens is 50 or more, and an Abbe number of another one of the first lens and the second lens is 40 or less.

4. The optical imaging system of claim 2, wherein one of the first lens and the second lens has a positive refractive power, and another one of the first lens and the second lens has a negative refractive power, and an Abbe number of a lens having the positive refractive power among the first lens and the second lens is 50 or more, and an Abbe number of a lens having the negative refractive power among the first lens and the second lens is 40 or less.

5. The optical imaging system of claim 1, wherein the second lens group has a negative refractive power, and is configured to be movable away from the object side of the optical imaging system toward the imaging plane of the optical imaging system to narrow a field of view of the optical imaging system, and to be movable away from the imaging plane of the optical imaging system toward the object side of the optical imaging system to widen the field of view of the optical imaging system.

6. The optical imaging system of claim 5, wherein the second lens group comprises a plurality of lenses having a negative composite refractive power, and any one lens among the plurality of lenses of the second lens group has a concave object-side surface and a concave image-side surface.

7. The optical imaging system of claim 6, wherein $0.6 \leq fGc/fG2 \leq 0.9$ is satisfied, where fGc is a focal length of the lens having the concave object-side surface and the concave image-side surface, and fG2 is a focal length of the second lens group.

8. The optical imaging system of claim 5, wherein the first lens group and the third lens group are disposed at fixed positions on the optical axis, and the fourth lens group is configured to be movable away from the imaging plane of the optical imaging system toward the object side of the optical imaging system to correct a focal position of the optical imaging system as the second lens group is moved away from the object side of the optical imaging system toward the imaging plane of the optical imaging system to narrow the field of view of the optical imaging system, and to be movable away from the object side of the optical imaging system toward the imaging plane of the optical imaging system to correct the focal point of the optical imaging system as the second lens group is moved away from the imaging plane of the optical imaging system toward the object side of the optical imaging system to widen the field of view of the optical imaging system.

9. The optical imaging system of claim 8, wherein $-1.8 \leq kf/kr \leq -1.2$ is satisfied, where kf is a refractive power of a first surface of the fourth lens group closest to the object side of the optical imaging system, and kr is a refractive power of a last surface of the fourth lens group closest to the imaging plane of the optical imaging system.

10. The optical imaging system of claim 8, wherein the fourth lens group is further configured to be movable away from the imaging plane of the optical imaging system toward the object side of the optical imaging system as an object distance changes from infinity to a near distance, and $0 \leq |Laf/fG4| \leq 0.1$ is satisfied, where Laf is a movement amount of the fourth lens group when the object distance changes from infinity to the near distance at a telephoto end of the optical imaging system at which the field of view of the optical imaging system is narrowest, and fG4 is a focal length of the fourth lens group.

11. The optical imaging system of claim 8, wherein the third lens group and the fourth lens group each have a positive refractive power.

12. The optical imaging system of claim 5, wherein the third lens group comprises a stop and a plurality of lenses sequentially disposed along the optical axis away from the object side of the optical imaging system toward the imaging plane of the optical imaging system, and a lens disposed closest to the stop among the plurality of lenses of the third lens group has a positive refractive power.

13. The optical imaging system of claim 12, wherein an object-side surface or an image-side surface of the lens disposed closest to the stop is aspherical.

14. The optical imaging system of claim 12, wherein a first surface of the first lens group is a surface of the first lens group disposed at the object side of the optical imaging system, and $0.4 \leq D13/TTL \leq 0.6$ is satisfied, where D13 is an optical axis distance from the first surface of the first lens group to the stop, and TTL is an optical axis distance from the first surface of the first lens group to the imaging plane.

15. The optical imaging system of claim 12, wherein a first surface of the first lens group is a surface of the first lens group disposed at the object side of the optical imaging system, and $0.4 \leq D13/fG1 \leq 0.8$ is satisfied, where D13 is an optical axis distance from the first surface of the first lens group to the stop, and fG1 is a focal length of the first lens group.

16. The optical imaging system of claim 5, wherein $0.4 \leq fG12w/fG12t \leq 0.7$ is satisfied, where fG12w is a composite focal length of the first lens group and the second lens group at a wide-angle end of the optical imaging system at which the field of view of the optical imaging system is widest, and fG12t is a composite focal length of the first lens group and the second lens group at a telephoto end of the optical imaging system at which the field of view of the optical imaging system is narrowest.

17. An optical imaging system comprising:

a first lens group, a second lens group, a third lens group, and a fourth lens group sequentially disposed in ascending numerical order along an optical axis of the optical imaging system from an object side of the optical imaging system toward an imaging plane of the optical imaging system, one lens group among the first lens group to the fourth lens group is configured to be movable along the optical axis to change a focal length of the optical imaging system, another lens group among the first lens group to the fourth lens group is configured to be movable along the optical axis to correct a focal position of the optical imaging system, and the first lens group comprises a reflective member configured to change a path of light incident on the reflective member, and at least one lens configured to converge light entering the optical imaging system onto the reflective member.

18. The optical imaging system of claim 17, wherein the first lens group and the third lens group are disposed at fixed positions on the optical axis, the second lens group is configured to be movable along the optical axis to change the focal length of the optical imaging system, and the fourth lens group is configured to be movable along the optical axis to correct the focal position of the optical imaging system as the second lens group moves along the optical axis to change the focal length of the optical imaging system.

19. The optical imaging system of claim 18, wherein the second lens group and the fourth lens group are further configured to be movable along the optical axis in opposite directions relative to each other as the second lens group moves along the optical axis to change the focal length of the optical imaging system and the fourth lens group moves along the optical axis to correct the focal position of the optical imaging system as the second lens group moves along the optical axis to change the focal length of the optical imaging system.

20. The optical imaging system of claim 17, wherein the other lens group among the first lens group to the fourth lens groups is further configured to be movable along the optical axis as an object distance changes between infinity and a near distance.

* * * * *